United States Patent

[11] 3,607,197

| | | | | |
|---|---|---|---|---|
| [72] | Inventor | John M. Ballantine | [56] | References Cited |
| | | Glasgow, Scotland | | UNITED STATES PATENTS |
| [21] | Appl. No. | 773,883 | | |
| [22] | Filed | Nov. 6, 1968 | 2,201,049  5/1940  Moore........................... 65/26 |
| [45] | Patented | Sept. 21, 1971 | 2,994,161  8/1961  Bair............................. 65/24 X |
| [73] | Assignee | Barr & Stroud Limited | 3,004,368  10/1961  Hick, Jr........................ 65/4 |
| [32] | Priority | Nov. 10, 1967 | 3,140,528  7/1964  Hildebrand, Jr. et al. .... 65/4 X |
| [33] | | Great Britain | 3,245,674  4/1966  Baer et al..................... 65/374 X |
| [31] | | 51168/67 | 3,331,670  7/1967  Cole............................. 65/4 |
| | | | 3,355,274  11/1967  Patriarche et al............ 65/374 X |

*Primary Examiner* — Frank W. Miga
*Attorney* — Mason, Fenwick & Lawrence

[54] MANUFACTURE OF FIBER OPTIC STACKS
6 Claims, 1 Drawing Fig.

[52] U.S. Cl.............................................. 65/169,
65/4, 65/24, 65/26, 65/39, 65/156, 65/170,
65/306, 65/374, 249/112, 264/338
[51] Int. Cl............................................. C03c 23/20,
C03c 39/00, C03b 39/00
[50] Field of Search................................. 65/Dig. 7,
4, 26, 24, 374, 169, 170, 39, 156, 170, 306;
264/338; 249/112

ABSTRACT: A process for manufacturing fiber optic stacks from an array of fibers subjected to heat and pressure in a fusion vessel, the array being separated from the vessel by a metal foil. The fusion vessel may be of graphite. A high-temperature lubricant, preferably boron nitride, may be used between the foil and the vessel.

PATENTED SEP 21 1971   3,607,197
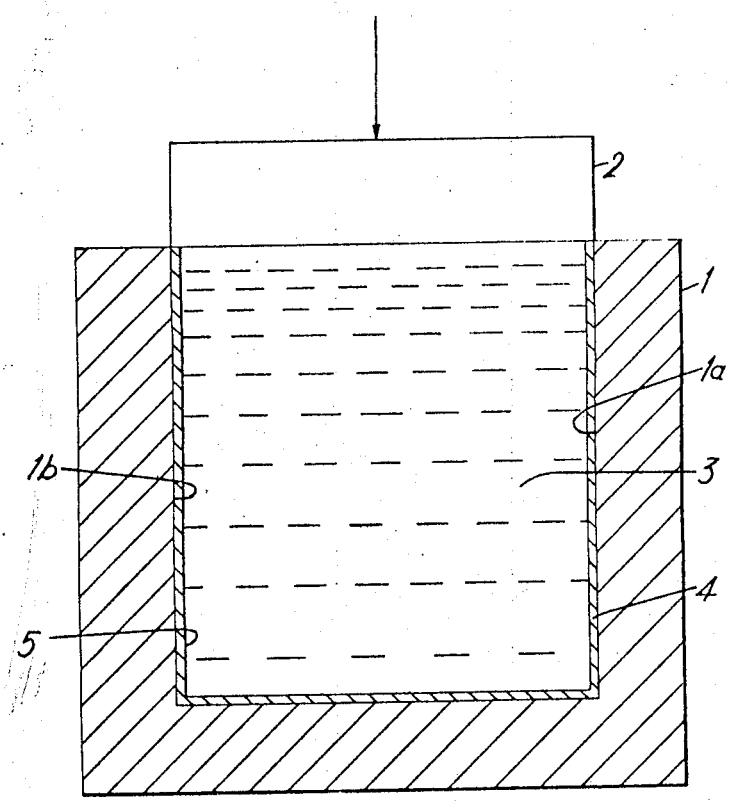
Inventor
JOHN McKILLOP BALLANTINE
By Mason, Fenwick & Lawrence
Attorneys

MANUFACTURE OF FIBER OPTIC STACKS

This invention relates to improvements in the manufacture of fiber optic stacks, i.e. fused blocks of fibers made of glass or other material having particular optical characteristics.

The manufacture of such stacks involves accurately aligning fibers in a fusion vessel whose strength is high at the temperature and pressure of the fusion process. The fibers rest on the base of the vessel and are constrained by its walls on at least two sides during the fusion process. Heat is applied to bring the temperature of the fibers to a point at which they are plastic, and pressure is then applied to compact the fiber array.

It is normal to carry out the process at as low a temperature as will allow flowing of the glass under such pressure as can be applied, and the material does not act as a liquid under pressure. Indeed, there is a tendency for the load applied to be transmitted by the upper fibers to the walls of the vessel thus relieving the lower fibers from load. As a result a "bridging" effect occurs where the upper fibers of the stack are compressed to form an arch and the lower fibers are subjected to a much-reduced load.

The object of the present invention is to obviate or mitigate these disadvantages.

The present invention is a process for the manufacture of fiber optic stacks, including the steps of covering the walls of a fusion vessel with metal foil, arranging an array of fibers in the prepared fusion vessel, and applying heat and pressure to the array.

An embodiment of the present invention will now be described, by way of example, with reference to the accompanying drawing, in which the single FIGURE is a view, partly in section, of apparatus being used in accordance with the present invention.

Referring now to the drawing, a conventional fusion vessel 1 has a base and two walls forming a rigid structure. The internal faces 1a, 1b of walls are sprayed with a high-temperature lubricant, in this embodiment boron nitride, to form a lubricating layer 4, and on top of this is placed a metal foil 5, in this embodiment aluminum foil. Optical fibers 3 are then arranged in an array with their axes parallel to the base of the fusion vessel 1. Heat is applied sufficient to soften the fibers, and a ram 2 then exerts pressure to fuse the fibers together. The boron nitride layer 4 allows smooth movement of the fibers relative to the wall, and the metal foil prevents the lubricant from entering the fiber array.

The choice of lubricant is determined by the temperature and pressure of fusion. The lubricant must retain its lubricating properties at this temperature and pressure. The foil must similarly remain chemically unchanged, and collapse under the applied pressure, at this temperature.

It is, of course, possible to spray or paint the high-temperature lubricant on the metal foil before this in placed in the fusion vessel.

It is also possible to omit the lubricant when self-lubricating materials or combinations of materials are used. One example of this is the use of aluminum foil in a graphite fusion vessel.

The present invention has several advantages in addition to that described hereinbefore. The fiber array is compacted by the application of a lower pressure for a given temperature. The stack is more easily removed from the fusion vessel. A metallic layer is welded to the outside of the stack during the pressing process, which may be useful for attaching metal components. If this metallic outer layer is undesirable, it may be removed by an acid.

I claim:
1. Apparatus for the manufacture of fiber optic stacks comprising a fusion vessel having bottom and side walls, forming a receptacle for
   an array of optic fibers,
   means for applying heat to said fibers,
   means for applying pressure to said fibers in said forming receptacle,
   toward said bottom,
   a metal foil positioned between said fibers and said sidewalls of the receptacle,
   lubricating means positioned adjacent said metal foil on the side opposite to said fibers contact to substantially prevent transmission of said pressure from said fibers to said walls and maintain said pressure substantially entirely upon said fibers.
2. The apparatus of claim 1 including said lubricating means being a high-temperature lubricant.
3. The apparatus of claim 2 wherein said lubricant is boron nitride.
4. The apparatus of claim 1 including said lubricant means is graphite formed as part of said walls.
5. The apparatus of claim 1 wherein said foil is aluminum.
6. The apparatus of claim 5 wherein said lubricant is boron nitride.